United States Patent
Zak, Jr. et al.

(10) Patent No.: US 6,789,258 B1
(45) Date of Patent: Sep. 7, 2004

(54) SYSTEM AND METHOD FOR PERFORMING A SYNCHRONIZATION OPERATION FOR MULTIPLE DEVICES IN A COMPUTER SYSTEM

(75) Inventors: Robert C. Zak, Jr., Bolton, MA (US); Christopher J. Jackson, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/569,987

(22) Filed: May 11, 2000

(51) Int. Cl.[7] ............................................. G06F 3/00

(52) U.S. Cl. ...................................... 719/317; 709/400

(58) Field of Search ........................... 709/400, 317, 709/107; 714/51; 713/400; 718/103

(56) References Cited

U.S. PATENT DOCUMENTS

| | | | | |
|---|---|---|---|---|
| 4,590,555 A | * | 5/1986 | Bourrez | 718/103 |
| 5,450,573 A | * | 9/1995 | Gronemeyer | 709/400 |
| 5,822,571 A | * | 10/1998 | Goodrum et al. | 713/400 |
| 5,832,254 A | * | 11/1998 | Brewer | 709/400 |
| 5,915,111 A | * | 6/1999 | Ouchi | 709/107 |
| 5,958,019 A | | 9/1999 | Hagersten et al. | |
| 6,117,181 A | | 9/2000 | Dearth et al. | |
| 6,266,745 B1 | * | 7/2001 | de Backer et al. | 711/147 |
| 6,385,743 B1 | * | 5/2002 | Huckfeldt et al. | 714/51 |

FOREIGN PATENT DOCUMENTS

EP 0 817 075 1/1998

OTHER PUBLICATIONS

"Lock–Free Garbage Collection for Multiprocessors", Herlihy, et al, *IEEE Transactions on Parallel and Distributed Systems*, IEEE Inc., New York, vol. 3, No. 3, May 1, 1992, pp. 304–311.

"Comparing Barrier Algorithms", Arenstorf, et al, *Parallel Computing*, Elsevier Publishers, Amsterdam, NL, vol. 12, No. 2, Nov. 1, 1989, pp. 157–180.

"Barrier Synchronization Using Fetch–and–Add and Broadcast", *IBM Technical Disclosure Bulletin*, IBM Corp., New York, vol. 34, No. 8, Jan. 1992, pp. 33–34.

"Low–Cost Device for Contention–Free Barrier Synchronization", *IBM Technical Disclosure Bulletin*, IBM Corp., New York, vol. 31, No. 11, Apr. 1, 1989, pp. 382–389.

International search report application No. PCT/US01/15269 mailed Dec. 10, 2002.

* cited by examiner

*Primary Examiner*—Meng-Al T. An
*Assistant Examiner*—Van Nguyen
(74) *Attorney, Agent, or Firm*—Lawrence J. Merkel; Meyertons, Hood, Kivlin, Kowert & Goetzel, P.C.

(57) ABSTRACT

A system and method for performing a sync operation for multiple devices in a computer system is provided. The computer system may include a plurality of devices and a plurality of agents. The agents may be configured to perform tasks on behalf of the devices. A busy bit and a counter may be included for each of the agents. One of the devices may become an observer by initiating a sync operation. In response to a sync operation, busy agents may be identified using the busy bit for each agent. The busy agents may then be monitored to determine when each one has cycled using the busy bit and the counter for each busy agent. A busy agent may be determined to have cycled in response to its busy bit indicating that it is no longer busy or in response to its counter value differing from the counter value at the time the sync operation was initiated. Once each of the busy agents have cycled, the observer may determine that the sync operation is complete.

10 Claims, 4 Drawing Sheets

```
num_busy = 0;
for i = 1 to num_agents do
        //
        // Save original value of counter registers
        //
        agents_counters[i] = counter_registers[i]

//
        // Save busy status
        //
        agents_busy[i] = busy_registers[i]

//
        // Count busy agents
        if agents_busy[i] != 0
                num_busy = num_busy + 1
end do //
// Wait for all currently busy agents to cycle
//
while num_busy != 0
        num_busy = 0;
        for i = 1 to num_agents
                //
                // If agent is not now busy, it must have cycled
                //
                if busy_registers[i] == 0
                        agents_busy[i] = 0

//
                // If counter is different than the original, it must have cycled
                //
                if agents_counters[i] != counter_registers[i]
                        agents_busy[i] = 0

//
                // Count agents which still have not cycled
                //
                if agents busy != 0
                        num_busy = num_busy + 1
end while
```

Fig. 3

```
agents_counters = counter_register
agents_busy = busy_register
while agents_busy !=0
        agents_busy = agents_busy AND busy_register
        agents_cycled = agents_counters XOR counter_register
        agents_busy = agents_busy AND NOT agents_cycled
end while
```

Fig. 4

SYSTEM AND METHOD FOR PERFORMING A SYNCHRONIZATION OPERATION FOR MULTIPLE DEVICES IN A COMPUTER SYSTEM

BACKGROUND OF THE INVENTION

1. Field of the Invention

This invention relates generally to the field of computer systems and, more particularly, to performing a synchronization operation for multiple devices in a computer system.

2. Description of the Related Art

A central resource in a computer system may be configured to perform multiple processing operations simultaneously. The central resource may perform these multiple processing operations by including multiple processing elements, or agents. In some cases, the agents may be synchronized where all agents begin processing at the same time, spend the same amount of time processing, and thus finish processing their tasks at the same time. In other cases, the agents may be unsynchronized where individual agents may begin tasks at different times and may take different amounts of time to perform those tasks.

A central resource that includes multiple agents may receive a varying inflow of work from a variety of devices. As the agents in the central resource finish tasks, they may begin new tasks if new tasks are available or wait for new tasks if no tasks are pending. Agents that are currently performing or processing a task may be termed "busy" while agents that are not performing or processing a task may be termed "idle." The act of an agent finishing a task, whether or not another task is waiting to be processed, may be termed "cycling." Accordingly, an agent that has finished its task may be said to have cycled. In order to more efficiently utilize the central resource, the devices that use it need to be able to detect when tasks that have been submitted to the central resource have completed by the agents.

A device may detect the completion of a task or a set of tasks by a central resource by initiating a synchronization operation, referred hereafter as a sync operation. A sync operation may be described as the process of determining when all tasks being performed at a given time have completed. A device that initiates a sync operation may be called an "observer."

Several possible implementations of a sync operation exist. In one implementation, a system may simply stop processing new tasks until all outstanding tasks have been completed to complete a sync operation. In this case, the sync operation may undesirably delay the processing of new tasks. In another implementation, a system could require that agents signal completion of a task to the device that requested the task by sending a message or an interrupt. This implementation, however, may result in increased traffic on a system bus such that fewer devices may be connected to the bus and included in the system. In a further implementation, each agent could include a state bit that was visible to an observer and that was indicative of whether the agent was busy or not. To perform a sync operation in this implementation, an observer could monitor the state bits for each agent and determine that all tasks have been completed when the state bits indicate that all agents are idle. If the agents receive a steady supply of tasks, however, there is no assurance that all agents would ever be idle and the sync operation may not be able to complete. Yet a further sync operation implementation may involve including a dedicated synchronization resource in the central resource. Such an implementation may not allow multiple observers to be running sync operations concurrently and may not be fully scalable as additional observers may require additional resources to be added to the synchronization resource.

A system and method is needed to efficiently perform a sync operation for multiple devices in a computer system. In addition, a system and method is needed to allow for multiple concurrent sync operations and for scalability in a system that performs a sync operation for multiple devices.

SUMMARY

The problems outlined above are in large part solved by the use the system and method described herein. Generally speaking, a system and method for performing a sync operation for multiple devices in a computer system is provided. The computer system may include a plurality of devices and a plurality of agents. The agents may be configured to perform tasks on behalf of the devices. A busy bit and a counter may be included for each of the agents. One of the devices may become an observer by initiating a sync operation. In response to a sync operation, busy agents may be identified using the busy bit for each agent. The busy agents may then be monitored to determine when each one has cycled using the busy bit and the counter for each busy agent. A busy agent may be determined to have cycled in response to its busy bit indicating that it is no longer busy or in response to its counter value differing from the counter value at the time the sync operation was initiated. Once all of the busy agents have cycled, the observer may determine that the sync operation is complete.

In one particular embodiment, the counter for each agent may comprise a one bit counter. The one bit counters for each agent may be stored in a counter register and the busy bits for each agent may be stored in a busy register. In response to a sync operation, the values in these registers may be monitored to determine when all busy agents have cycled. Once all of the busy agents have cycled, the observer may determine that the sync operation is complete.

Certain embodiments described herein may allow for advantages over other systems and methods that are configured to implement a sync operation. For example, certain embodiments may allow for a relatively inexpensive hardware or software implementation using a busy bit and a counter for each agent in the system. In addition, certain embodiments may be fully scalable for any number of observers and different observers may perform sync operations concurrently without the need for additional hardware.

BRIEF DESCRIPTION OF THE DRAWINGS

Other objects and advantages of the invention will become apparent upon reading the following detailed description and upon reference to the accompanying drawings in which:

FIG. 3 is an embodiment of a pseudocode algorithm for performing a sync operation.

FIG. 4 is an embodiment of pseudocode algorithm for performing a sync operation using a one bit counter.

Figure 1:
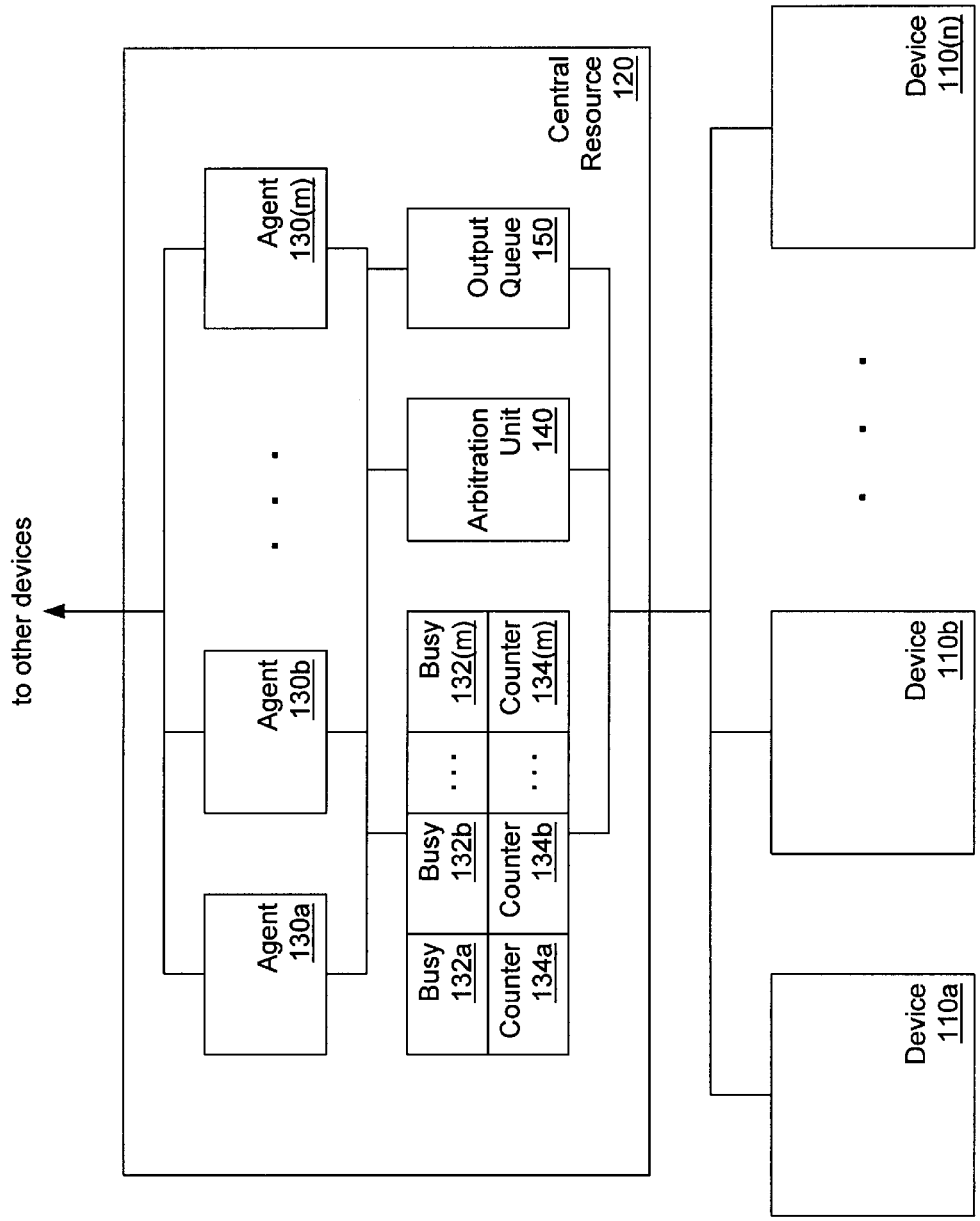
FIG. 1 is a block diagram illustrating one embodiment of devices coupled to a central resource in a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Turning now to FIG. 1, a block diagram illustrating one embodiment of devices coupled to a central resource in a computer system is shown. Other embodiments are possible and contemplated. FIG. 1 depicts any number, n, of devices 110a though 110(n) coupled to central resource 120. Central resource 120 includes any number of agents 130a through 130(m) coupled to arbitration unit 140 and output queue 150. Central resource 120 also includes busy bits 132a though 132(m) and counters 134a though 134(m). Busy bits 132a through 132(m) and counters 134a though 134(m) may correspond to agents 130a through 130(m), respectively. For example, busy bit 132a and counter 134a may correspond to agent 130a, and busy bit 132b and counter 134b may correspond to agent 130b. Accordingly, the number, m, of busy bits 132a through 132(m) and the number, m, of counters 134a though 134(m) may be the same as the number, m, of agents 130a through 130(m). Central resource 120 may also be coupled to other devices including other central resources as indicated.

As used in the following description of FIG. 1, devices 110a through 110(n) may be referred to collectively as 'devices 110' or individually as a 'device 110'. Agents 130a through 130(m) may be referred to collectively as 'agents 130' or individually as an 'agent 130'. Busy bits 132a through 132(m) may be referred to collectively as 'busy bits 132' or individually as a 'busy bit 132'. Counters 134a through 134(m) may be referred to collectively as 'counters 134' or individually as a 'counter 134'.

Central resource 120 may be configured to perform multiple processing operations simultaneously on behalf of devices 110 using agents 130. Each of these processing operations may be referred to as a task. A task may be initiated by a device 110 by conveying information concerning the task from the device 110 to central resource 120. Arbitration unit 140 may be configured to assign each task to an agent 130 for processing. In processing a task, agent 130 may convey information to other devices including other central resources to process or perform the task and may store the results of the task in output queue 150 until the results may be conveyed to the device 110. In some embodiments, output queue 150 may be omitted.

The type of tasks processed or performed may depend on the type of devices 110 and the type of central resource 120. In one embodiment, for example, devices 110 may comprise microprocessors and central resource 120 may comprise an interface to other sets of microprocessors. Devices 110 and central resource 120 may also be coupled to a system memory (not shown). In one particular embodiment, central resource 120 may be coupled to other central resources (not shown) similar to central resource 120 and these central resources may be coupled to other microprocessors (not shown) and other system memories (not shown). In these embodiments, the type of tasks may include system memory and input/output (IO) operations. In other embodiments, other types of tasks may be processed or performed.

Devices 110 may be configured to perform a sync operation. In FIG. 1, a device 110 that initiates and executes a sync operation may be called an observer. In the embodiment of FIG. 1, a busy bit 132 and a counter 134 may be included for each of agent 130. The busy bit 132 of an agent may indicate whether the agent 130 is busy or idle. The counter 134 of an agent 130 may increment its value in response to an agent 130 cycling, i.e. completing a task. The counter 134 may be any size counter including a one bit counter as discussed further below. Once the counter reaches its maximum value, it may return to zero the next time it is incremented.

An observer may perform a sync operation using the busy bit 132 and counter 134 of each agent 130. In response to initiating a sync operation, an observer may identify agents 130 that are busy using the busy bit 132 for each agent 130. In one embodiment, the observer may read the busy bits 132 at a first time and may identify agents 130 that are busy using the value of the busy bit 132 of each agent 130. For example, if value of the busy bit 132 of an agent 130 may be one if the agent 130 is busy and may be zero if the agent 130 is idle. By identifying agents 130 that are busy, the observer may implicitly determine the outstanding tasks at the time of the sync operation. Once these outstanding tasks complete, as may be evidenced by the agents that are processing them cycling, then the sync operation may complete. Accordingly, once an observer identifies the agents 130 that are busy, if any, it may complete the sync operation once each of these busy agents 130 cycles.

An observer may determine that an agent 130 that was busy when it initiated a sync operation has cycled using the busy bits 132 and the counters 134 of each busy agent 130. The observer may make this determination by monitoring the busy bits 132 and the counters 134 of each busy agent 130. A busy agent 130 may be determined to have cycled in response to its busy bit 132 indicating that it is no longer busy, i.e. it is idle, or in response to the value of its counter 134 differing from the value of its counter 134 at the time the sync operation was initiated. In one embodiment, the observer may periodically read the busy bits 132 of the busy agents 130 and may examine these busy bits 132 to determine if they now indicate that their respective busy agents 130 are idle. Once the busy bit 132 of a busy agent 130 indicates that that busy agent 130 is idle, then that agent 130 has cycled, i.e. it has completed its task that was outstanding when the sync operation was initiated. If a busy bit 132 of a busy agents 130 indicates that the busy agent 130 is currently busy, then the observer may not be able to determine whether this busy agent 130 has cycled using the busy bit 132 alone. The busy agent 130 may still be working on the task that was outstanding when the sync operation was initiated or it may have begun working on a subsequent task.

The observer may also periodically read the current values of counters 134 of the busy agents 130. The observer may compare the current values of the counters 134 of the busy agents 130 with the values of the counters 134 at the time when the sync operation was initiated to determine if the current values differ from the previous values. If the current value for a busy agent 130 differs from the previous value, then the busy agent 130 has cycled since the counter would have been incremented in response to the busy agent 130 cycling. If the current value for a busy agent 130 does not differ from the previous value, then the observer may not be able to determine whether this busy agent 130 has cycled using these values of counter 134 alone. The busy agent 130 may still be working on the task that was outstanding when the sync operation was initiated or it may have completed enough tasks since the outstanding task to wrap its counter 134 around where it now indicates the previous value. It may be noted that the likelihood of this latter possibility may be minimized by using larger counters. Larger counters, however, may be more expensive as they may require additional hardware.

By monitoring the busy bits 132 and the counters 134 of the agents 130, an observer may determine when all of the busy agents 130 have cycled and may determine when a sync operation is complete, i.e. when all tasks that were outstanding when the sync operation was initiated have completed. FIGS. 3 and 4, described below, illustrate specific embodiments of algorithms that may be used by an observer to perform a sync operation. These algorithms may perform the same functions that use busy bits 132 and counters 134 that were described on a more general level above.

It may be noted that in other embodiments, an observer itself may not perform all of the functions described above or shown in the algorithms of FIGS. 3 and 4. Certain, or possibly all, of the functions described above or shown in the algorithms of FIGS. 3 and 4 may be performed by central resource 120 or by a device 110 or devices 110 other than the observer.

Once a sync operation completes, an observer may note state information regarding itself or the system in general. The observer may use this state information for the purposes of error detection and correction, system analysis, and/or task scheduling and balancing for itself and/or the other devices 110 in the system. Other uses of a sync operation are possible and contemplated.

In one particular embodiment, counters 134 for each agent 130 may each comprise a one bit counter. In this embodiment, counters 134 may be stored in a counter register (not shown) and busy bits 132 may be stored in a busy register. The counter 134 and the busy bit 132 for a particular agent 130 may be stored in the same bit position in the counter register and the busy register, respectively. An observer may operate on the register values as a whole to perform a sync operation. FIG. 4 illustrates an embodiment of an algorithm that may be used to perform a sync operation where the counters used are one bit counters.

The embodiment described in FIG. 1, may allow for advantages over other systems and methods that are configured to implement a sync operation. For example, the embodiment of FIG. 1 may allow for a relatively inexpensive hardware or software implementation using a busy bit 132 and a counter 134 for each agent 130 in the system. In addition, the embodiment of FIG. 1 may be fully scalable for any number of observers and different observers may perform sync operations concurrently without the need for additional hardware. Where multiple sync operations are being performed concurrently, each observer may separately monitor the busy bits and counters of the busy agents for each sync operation and may separately determine when its sync operation has completed.

Figure 2:
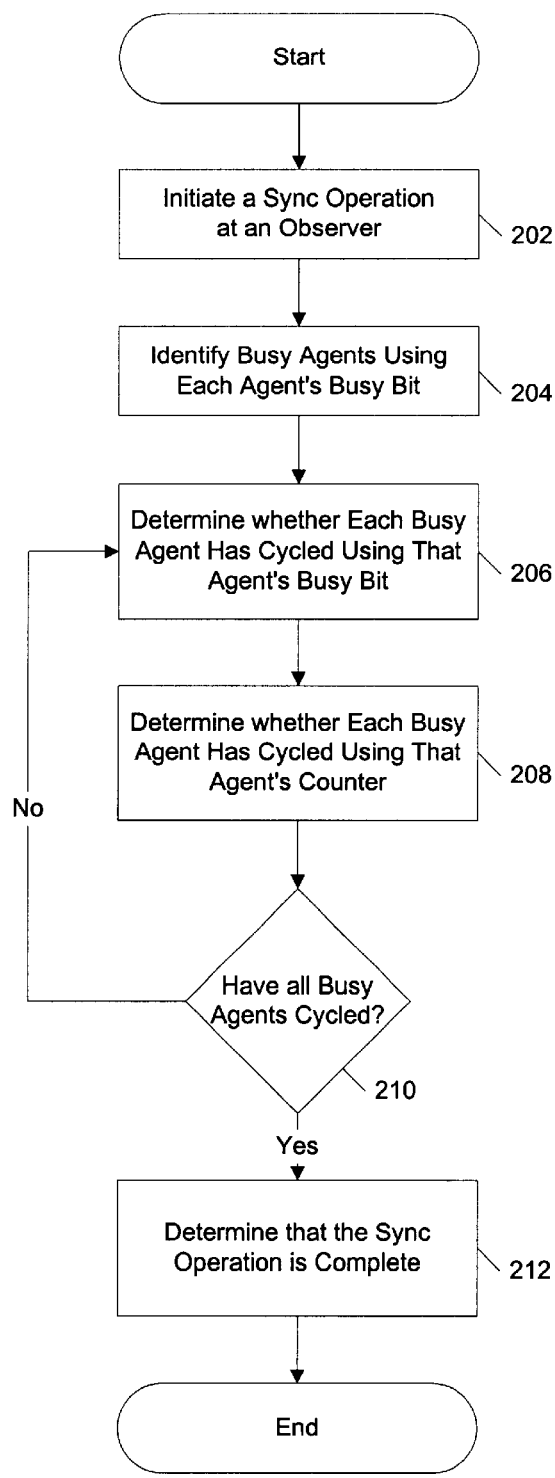
FIG. 2 is a flow chart illustrating a method for performing a sync operation.

Turning now to FIG. 2, a flow chart illustrating a method for performing a sync operation is shown. Variations on the method are possible and contemplated. A sync operation may be initiated as indicated in block 202. Busy agents may be identified using each agent's busy bit as indicated in block 204. These busy agents may be identified at or near the time in which the sync operation is initiated. It may then be determined whether each busy agent identified in block 204 has cycled using that agent's busy bit as indicated in block 206. It may also be determined whether each busy agent identified in block 204 has cycled using that agent's counter as indicated in block 208. A determination may be made as to whether all busy agents identified in block 204 have cycled as indicated in block 210. If all busy agents identified in block 204 have not cycled, the actions of blocks 206 and 208 may be repeated until all busy agents identified in block 204 have cycled. Once all busy agents identified in block 204 have cycled, it may be determined that the sync operation is complete as indicated in block 212.

It may be noted that the term "busy agent" as it is used with regard to blocks 206, 208, and 210 may refer to agents that were determined to be busy at or near the time in which the sync operation was initiated as discussed above with regard to block 204. Although other agents may later become busy, the sync operation may be primarily concerned with those agents that were busy at or near the time that the sync operation was initiated.

Turning now to FIG. 3, an embodiment of a pseudocode algorithm for performing a sync operation is shown. Variations of the pseudocode are possible and contemplated. The algorithm shown in FIG. 3 may be used in embodiments that include a busy bit and a counter for each agent such as the embodiment shown in FIG. 1. The algorithm may be executed by an observer as a part of a sync operation. The algorithm shown in FIG. 3 assumes that each agent's busy bit will be one when the agent is busy and zero when the agent is idle and that each agent's counter will be incremented whenever the agent cycles. Variations on the algorithm may be based on other values of an agent's busy bit and other operations of an agent's counter. For purposes of the algorithm, the busy bit of the 'ith' agent may be stored in busy_register[i] and the counter of the 'ith' agent may be stored in counter_registers[i]. In the description below for FIG. 3, these registers may be referred to generically as the busy bit and the counter for a given agent.

The algorithm of FIG. 3 may begin by identifying the number of busy agents in a system using each agent's busy bit and may then determine when each of the busy agents cycles using the busy bit and counter of each busy agent. As may be seen, the variable num_busy may be initialized to zero. The algorithm may then begin a for loop for each agent in the system where the variable num_agents represents the number of agents in a system. Within the for loop, the values of an agent's counter and busy bit may be saved using the variables agents_counters[i] and agents_busy[i] and the number of busy agents may be counted and stored using the variable num_busy.

After the functions in the for loop are performed for each agent, the algorithm may begin a while loop that may continue as long as the variable num_busy does not equal zero. It may be noted that the once the value of num_busy equals zero, all busy agents for this sync operation will have cycled and the sync operation may be complete. Within the while loop, the variable num_busy may be reset to zero. A for loop may then begin to determine how many agents are busy. Within the for loop, if the busy bit of an agent is zero, then that agent is currently idle and, if it was determined to be busy by the for loop above, has cycled. Thus, this agent should not be included in the num_busy count. If the value of the counter of an agent is not equal to the counter value saved by the for loop above, then the agent has cycled and should not be included in the num_busy count. With each iteration of the for loop, the num_busy count may either by left unchanged or incremented. After the for loop completes, the while loop may continue until num_busy equals zero. In this manner, the busy bit and counter for each agent may be used to perform a sync operation.

Turning now to FIG. 4, an embodiment of a pseudocode algorithm for performing a sync operation using a one bit counter is shown. Variations of the pseudocode are possible and contemplated. The algorithm shown in FIG. 4 may be used in embodiments that include a busy bit and a one bit counter for each agent such as the embodiment shown in FIG. 1. The algorithm may be executed by an observer as a part of a sync operation. The algorithm of FIG. 4 may perform logical operations on the busy bits as though they are located in a register named busy_register. The algorithm may also perform logical operations on the one bit counters as though they are located in a register named counter_register. The busy bit and counter for an agent may be in the same bit position in the busy_register and the counter_register. The algorithm shown in FIG. 4 assumes that each agent's busy bit will be one when the agent is busy and zero when the agent is idle and that each agent's counter will be incremented whenever the agent cycles. Variations on the algorithm may be based on other values of an agent's busy bit and other operations of an agent's counter.

As may be seen in the algorithm shown in FIG. 4, the contents of the counter_register and the contents of the busy_register may be stored in the agents_counters and agents_busy registers, respectively, in response to a sync operation being initiated. The algorithm may then begin a while loop that may continue as long as the value in the agents_busy register does not equal zero. It may be noted that once the contents of agents_busy equal zero, the sync operation may be complete. Within the while loop, a logical AND operation may be performed using the values in the agents_busy and busy_register registers and the result may be stored in the agents_busy register. A logical exclusive OR (XOR) operation may also be performed using the values in the agents_counters and counter_register registers and the result may be stored in the agents_cycled register. A logical AND NOT operation may then be performed using the values in the agents_busy and agents_cycled registers and the result may be stored in the agents_busy register. After these operations are performed, the value in the agents_busy register may be compared to zero to determine if all of the agents that were busy at or near the time when the sync operation was initiated have cycled.

It may be noted that the algorithm shown in FIG. 4 may be made more efficient by placing both the busy bits and the counters of each agent into one register instead of using two registers as discussed above.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. An apparatus comprising:
   an observer; and
   a central resource coupled to the observer, the central resource comprising:
      a plurality of agents;
      a plurality of busy bits, wherein each of the plurality of busy bits corresponds to a respective one of the plurality of agents, and wherein each of the plurality of busy bits is in either a busy state or an idle state during use; and
      a plurality of counters, wherein each of the plurality of counters corresponds to a respective one of the plurality of agents;
   wherein the observer is configured, in response to initiating a sync operation, to identify one or more busy agents of the plurality of agents responsive to the plurality of busy bits, and wherein the observer is configured to subsequently detect that a busy agent has cycled responsive to a corresponding busy bit of the plurality of busy bits being in the idle state; and wherein the observer is configured to subsequently detect that a busy agent has cycled responsive to a corresponding counter of the plurality of counters changing value, and wherein the observer is configured to determine that the sync operation is complete in response to detecting that each busy agent has cycled.

2. The apparatus as recited in claim 1 wherein each of the plurality of busy bits that corresponds to one of the busy agents is in the busy state.

3. The apparatus as recited in claim 1 wherein, in response to one of the plurality of agents completing a task, the corresponding busy bit is changed to the idle state and a value in the corresponding counter is changed.

4. The apparatus as recited in claim 3 wherein, in response to the one of the plurality of agents starting a new task, the corresponding busy bit is changed to the busy state.

5. The apparatus as recited in claim 1 wherein each of the plurality of counters is a one bit counter.

6. In an apparatus comprising a plurality of agents; a plurality of busy bits, wherein each of the plurality of busy bits corresponds to a respective one of the plurality of agents, and wherein each of the plurality of busy bits is in either a busy state or an idle state during use; and a plurality of counters, wherein each of the plurality of counters corresponds to a respective one of the plurality of agents; a method comprising:
   in response to initiating a sync operation, identifying one or more busy agents of the plurality of agents responsive to the plurality of busy bits;
   subsequently detecting that each busy agent has cycled responsive to the plurality of busy bits and the plurality of counters, wherein a given busy agent has cycled if a corresponding busy bit of the plurality of busy bits is in the idle state; and wherein a given busy agent has cycled if a corresponding counter of the plurality of counters changes value; and
   determining that the sync operation is complete in response to detecting that each busy agent has cycled.

7. The method as recited in claim 6 wherein each of the plurality of busy bits that corresponds to one of the busy agents is in the busy state.

8. The method as recited in claim 6 further comprising:
   in response to one of the plurality of agents completing a task, changing the corresponding busy bit to the idle state; and
   in response to the one of the plurality of agents completing the task, changing a value in the corresponding counter.

9. The method as recited in claim 8 further comprising:
   the one of the plurality of agents starting a new task; and
   in response to the one of the plurality of agents starting the new task, changing the corresponding busy bit to the busy state.

10. The method as recited in claim 6 wherein each of the plurality of counters is a one bit counter.

* * * * *